United States Patent [19]

Foggini

[11] 4,435,009
[45] Mar. 6, 1984

[54] SUN VISORS OF THE TYPE HAVING A CELL STRUCTURE PARTICULARLY FOR AUTOMOBILE VEHICLES

[75] Inventor: Giovanni Foggini, Turin, Italy

[73] Assignee: Lear S.n.c. di Foggini & C., Orbassano, Italy

[21] Appl. No.: 338,816

[22] Filed: Jan. 11, 1982

[30] Foreign Application Priority Data

Jan. 27, 1981 [IT] Italy ............................... 67098 A/81

[51] Int. Cl.³ .............................................. B60J 3/00
[52] U.S. Cl. ................................. 296/97 H; 296/97 K
[58] Field of Search ................. 296/97 H, 97 K, 97 R

[56] References Cited

U.S. PATENT DOCUMENTS 2,095,715 10/1937 Rhein ................................ 296/97 K
3,649,070 3/1972 Hoyer ................................ 296/97 H
4,353,591 10/1982 Cziptschirsch .................... 296/97 H

FOREIGN PATENT DOCUMENTS 2032368 5/1980 United Kingdom ............ 296/97 H

*Primary Examiner*—Robert R. Song
*Attorney, Agent, or Firm*—Guido Modiano; Albert Josif

[57] ABSTRACT

The sun visor is of the type which comprises a load bearing structure including a shaped element formed from a straight cell polymeric material, the cells extending parallel to one another and having a trough-like shape, and a suspension and pivot rod accommodated for rotation within one of the cell. At least one portion of the rod is formed with a crank-like eccentric shape engaging in the cell of a corresponding movable portion of the structure, which is partially separated therefrom by cuts, for the purpose of obtaining at least two stable tilted positions which the sun visor will occupy with a snap movement, one position being selected to coincide with the home position of the sun visor.

6 Claims, 5 Drawing Figures

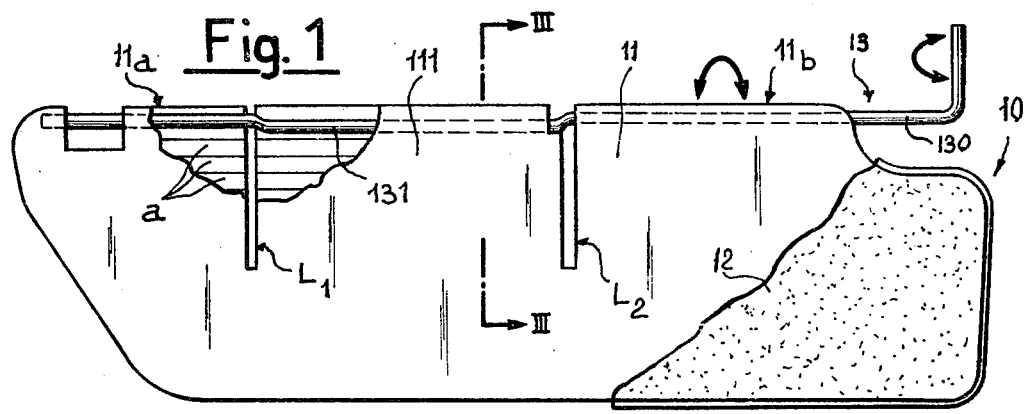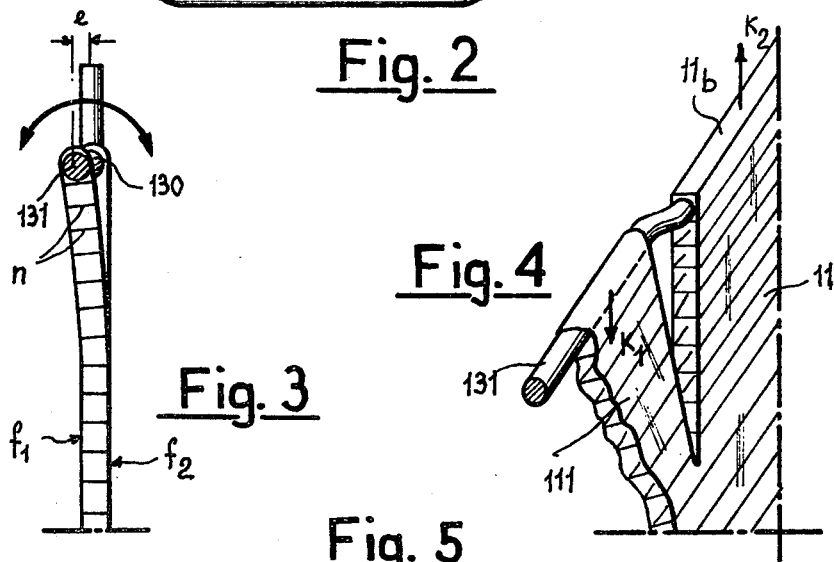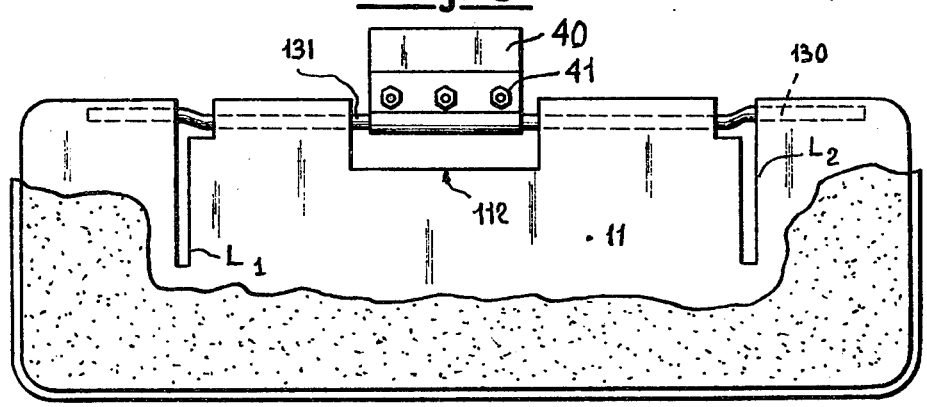

SUN VISORS OF THE TYPE HAVING A CELL STRUCTURE PARTICULARLY FOR AUTOMOBILE VEHICLES

BACKGROUND OF THE INVENTION

This invention relates to an improvement to sun visors of the type having a cell structure, particularly for automobile vehicles.

The British Patent pubblication No. 2,032,368 by this same Applicant disclosed a sun visor which is characterized in that it comprises a load bearing structure including a shaped element die cut from a sheet of cellular polymeric material formed by a continuous extrusion process; the cells being straight or rectilinear, parallel to one another, and having a trough-like cross-sectional configuration. The cited Patent Application further provides attaching means comprising at least one metal rod accommodated along a straight segment thereof of a convenient length in one of the trough-like cells of the load bearing cellular structure, thereby a hinge connection is achieved which serves both to suspend the sun visor and secure it in frictional engagement, said engagement being accomplished simply by frictional force between the rod and inside surface of the cell trough.

SUMMARY OF THE INVENTION

The task of the present invention is that of ensuring, in a simple and reliable manner, that the visor hinge connection is provided with two stable angular tilting positions which the visor will occupy with a snap movement when moved through the distance separating them; one of said positions coinciding with the sun visor "home" position, whereat the visor lies parallel to and adjacent the roof panel, perhaps within a seat specially provided therein.

This task is achieved, according to the invention, by a sun visor of the type having a plate-like member made at least in part of a channel-like cell structure, particularly for motor vehicles, comprising a suspension and pivot rod for the plate-like member and driven into one of the channel-like cells of said structure, characterized in that said plate-like member has a load bearing portion and a movable portion resiliently yieldable with respect to said load bearing portion, said suspension and pivot rod having at least one length thereof having an eccentric crank-like configuration in engagement with said movable portion, said movable portion and said load bearing portion of the plate-like member being devided along boundary lines allowing relative movement between said movable portion and said load bearing portion.

If desired, plural eccentric portions may be provided on the rod spaced apart angularly from one another and cooperating with corresponding movable parts of the structure, in which case the sun visor would be made capable of occupying any of a number of angularly tilted positions, correspondingly angularly set apart from one another.

BRIEF DESCRIPTION OF THE DRAWING

The invention will be more readily apparent from the following detailed description in conjunction with the accompanying drawings, given herein by way of illustration only and where:

FIG. 1 is an elevation view, partly in section, of an improved sun visor of the adjustable type according to this invention;

FIG. 2 is a detail view of the hinge connection or pivot rod;

FIG. 3 is an enlarged scale sectional view taken along the line III—III of FIG. 2;

FIG. 4 is a fragmentary perspective view illustrating the operation of the pivot rod; and FIG. 5 is an elevation view of a sun visor of the nonadjustable type, with centrally located hinge connection.

DESCRIPTION OF THE PREFERRED EMBODIMENTS

As described in the cited prior Patent Application, the sun visor, generally indicated at 10, comprises an internal load bearing structure 11 made of a polymeric material and covered with a coating 12 which encloses and contains said structure and suspension and pivot or hinge connection means, generally indicated at 13. The structure 11 includes an element shaped to the contour of the sun visor, which is die cut from an extruded cell sheet which is characterized by the presence of parallel continuous cells a bordered by parallel ribs n sandwiched between two juxtaposed sheets $f_1$–$f_2$; the sheet being produced with a continuous extrusion process. The suspension means 13 comprise a cylindrical metal rod 130 which is simply thrust into one of said cells to provide a frictional engagement type of hinge connection, the sun visor 10 being tiltable about the common axis of the cell and rod. One end of the latter protrudes out of the sun visor and is bent to a right angle to engage with a seat of an adjustment hinge where, as in the instance shown in FIG. 1, the sun visor is of the side tilting type.

According to this invention, on the rod 130 there is formed an eccentric portion 131 substantially in the shape of a crank; the extent of the eccentricity ranges from 3 to 8 mm, approximately. The eccentric portion 131 engages with a corresponding movable portion 111 of the load bearing structure 11 which is partially separated from said structure and made resilient relatively thereto by a pair of cut and separation line $L_1$–$L_2$ extending perpendicularly, or nearly perpendicularly, to the pivot rod 130.

More specifically, and as shown in FIG. 3, the separation lines $L_1$–$L_2$ allow the portion 111 to occupy resiliently angularly offset positions on either side of the plane containing the structure 11, along the path imposed by the eccentric portion 131, as the visor is pivoted relatively to the rod 130. The rotation of the movable portion 111 of the structure relatively to the eccentric portion 131 of the rod is elastically opposed by said movable portion with an action $K_1$ meeting a reaction $K_2$ pointing in the opposite direction from the shoulders $11_a$–$11_b$ of the fixed structure. In the position shown in FIGS. 3 and 4 the force $K_1$ is offset with respect to the plane of the visor in which the force $K_2$ acts so that such forces will produce an elastic couple of forces which urges the visor into either of two equilibrium positions with respect to the rod: the one shown in FIG. 3, and the respective symmetrical one relatively to the plane containing the structure 11. The two positions are angularly spaced apart by approximately 180° and are arrived at with a snap movement by the visor as the eccentricity e of the portion 131 approaches a condition of perpendicularity of the plane of the fixed portion 11.

One of said stable angular positions is selected to coincide with the home position of the sun visor, whereat the latter extends parallel to the car roof panel, optionally within a seat specially provided therein. The intensity of the elastic couple applied to the sun visor can be adjusted, within limits, by varying the deformability of the portion 111. For this purpose, one can manipulate the value of the eccentricity of the rod portion 131, the spacing and depth of the cut lines $L_1$–$L_2$.

In the embodiment of FIG. 5, there is shown a sun visor of the non-adjustable type, which is supported at the middle thereof by a hooking plate 40 being torsionwise secured by means of bolt fasteners 41 to the eccentric portion 131 of the rod 130. The movable portion 111 of the load bearing structure is here lightened by means of a saddle-like cutout 112 adapted to accommodate the plate 40 and cooperate with the eccentric portion of the rod in quite a similar manner to the one already described hereinabove.

It will be appreciated that the rod may be provided with a number of eccentric portions such as 131, spaced apart both axially and angularly, e.g. two portions angularly spaced apart at 90° from each other. In that case, the visor would be able to occupy any of a corresponding plurality of positions, all angularly stable with respect to the rod, e.g. four positions angularly spaced apart at 90° from one another.

Furthermore, and of course within the scope of the present invention, the implementation details and embodiments may be amply modified with respect to the ones described and illustrated by way of example and not of limitation in the foregoing description and accompanying drawings.

What is claimed is:

1. A sun visor of the type having a plate-like member made at least in part of a channel-like cell structure, particularly for motor vehicles, comprising a suspension and pivot rod for the plate-like member and driven into one of the channel-like cells of said structure, characterized in that said plate-like member has a load bearing portion and a movable portion resiliently yieldable with respect to said load bearing portion, said suspension and pivot rod having at least one length thereof having an eccentric crank-like configuration in engagement with said movable portion, said movable portion and said load bearing portion of the plate-like member being devided along boundary lines allowing relative movement between said movable portion and said load bearing portion.

2. A visor according to claim 1, characterized in that said boundary lines are cuts extending transverse to said rod.

3. A visor according to claim 1, wherein said boundary lines have elastic properties and extend transverse to said rod and parallel thereto at a distance therefrom.

4. A sun visor according to claim 1, chacteristized in that the action exerted by said rod eccentric portion on the corresponding movable portion of said load bearing structure and the reaction of the fixed portion of said structure generate an elastic couple urging the sun visor to occupy, with a snap movement, either of two equilibrium positions angularly spaced apart at about 180° from each other, one of said positions being selected to coincide with the home position of the sun visor.

5. A sun visor according to claim 4, characterized in that the extent of said elastic couple is adjustable by varying the elastic deformability of the movable portion of said structure and the eccentricity of the crank portion of said suspension and pivot rod, the elastic deformability of the movable portion of said structure being a function of the spacing and depth of said cut and partial separation lines.

6. A sun visor according to claim 1, comprising a load bearing structure made of a cellular polymeric material having channel-shaped straight and parallel cells, a suspension and pivot rod including a metal rod driven into one cell of said structure to provide a hinge connection in frictional engagement for the purpose of tilting the sun visor about the axis of said rod, characterized in that at least one portion of said rod is eccentrically formed to a crank-like shape and engages, with rotation capabilities, the straight cell of a corresponding movable portion of said load bearing structure, said movable portion being made resilient relatively to said structure by means of cut and partial separation lines adapted to enable said movable portion to occupy elastically any of a number of positions angularly shifted to either sides of a plane containing said load bearing structure, said rod eccentric portion and movable portion of said load bearing structure cooperating together to cause the sun visor to occupy either of two tilted positions with a snap movement, said positions being stable, angularly spaced apart at about 180°, and one of said positions being selected to coincide with the home position of the sun visor.

* * * * *